US008469306B2

(12) United States Patent
Kuhn, Jr.

(10) Patent No.: US 8,469,306 B2
(45) Date of Patent: Jun. 25, 2013

(54) PUREBRED AND HYBRID ELECTRIC VTOL TILT ROTOR AIRCRAFT

(76) Inventor: Ira F. Kuhn, Jr., McLean, VA (US)

( * ) Notice: Subject to any disclaimer, the term of this patent is extended or adjusted under 35 U.S.C. 154(b) by 678 days.

(21) Appl. No.: 12/693,657

(22) Filed: Jan. 26, 2010

(65) Prior Publication Data

US 2011/0024555 A1 Feb. 3, 2011

Related U.S. Application Data

(60) Provisional application No. 61/147,499, filed on Jan. 27, 2009.

(51) Int. Cl.
*B64C 27/28* (2006.01)
*B64C 29/00* (2006.01)
*B64D 41/00* (2006.01)
*B64D 35/00* (2006.01)

(52) U.S. Cl.
USPC .............................. 244/12.4; 244/58; 244/60

(58) Field of Classification Search
USPC .................. 244/7 R, 7 C, 12.4, 17.11, 17.19, 244/17.23, 23 B, 53 R, 58, 60; 446/34, 36
See application file for complete search history.

(56) References Cited

U.S. PATENT DOCUMENTS

| | | | |
|---|---|---|---|
| 5,823,468 A | 10/1998 | Bothe | |
| 5,890,441 A | 4/1999 | Swinson et al. | |
| 6,641,365 B2 | 11/2003 | Karem | |
| 6,655,631 B2 | 12/2003 | Austen-Brown | |
| 6,719,244 B1 | 4/2004 | Gress | |
| 7,472,863 B2 | 1/2009 | Pak | |
| 7,789,341 B2 * | 9/2010 | Arlton et al. | 244/17.23 |
| 7,857,254 B2 * | 12/2010 | Parks | 244/12.4 |
| 7,874,513 B1 * | 1/2011 | Smith | 244/12.4 |
| 8,083,173 B2 * | 12/2011 | Arlton et al. | 244/17.23 |
| 8,146,854 B2 * | 4/2012 | Lawrence | 244/17.23 |
| 2002/0154996 A1 | 10/2002 | Karem | |
| 2003/0062443 A1 | 4/2003 | Wagner et al. | |
| 2003/0085319 A1 | 5/2003 | Wagner et al. | |

(Continued)

FOREIGN PATENT DOCUMENTS

EP 1211173 5/2002

OTHER PUBLICATIONS

Bain, Jeremy, et al.; Aerodynamic and Acoustic Design of a Low Noise Dual Rotor Tail-sitter; American Helicopter Society Aeromechanics Specialists' Conference; San Francisco, CA; Jan. 20-22, 2010.

(Continued)

*Primary Examiner* — Joseph W Sanderson
(74) *Attorney, Agent, or Firm* — Fish & Associates, PC

(57) ABSTRACT

Electrically powered Vertical Takeoff and Landing (VTOL) aircraft are presented. Contemplated VTOL aircraft can include one or more electrical energy stores capable of delivering electrical power to one or more electric motors disposed within one or more rotor housings, where the motors can drive the rotors. The VTOL aircraft can also include one or more sustainer energy/power sources (e.g., batteries, engines, generators, fuel-cells, semi-cells, etc.) capable of driving the motors should the energy stores fail or deplete. Various VTOL configurations are presented including an all-battery purebred design, a light hybrid design, and a heavy hybrid design. The contemplated configurations address safety, noise, and outwash concerns to allow such designs to operate in built-up areas while retaining competitive performance relative to existing aircraft.

13 Claims, 19 Drawing Sheets

U.S. PATENT DOCUMENTS

| | | | | |
|---|---|---|---|---|
| 2003/0094537 A1* | 5/2003 | Austen-Brown | | 244/7 R |
| 2006/0011777 A1* | 1/2006 | Arlton et al. | | 244/7 B |
| 2007/0034738 A1 | 2/2007 | Sanders, Jr. et al. | | |
| 2007/0057113 A1 | 3/2007 | Parks | | |
| 2007/0262195 A1* | 11/2007 | Bulaga et al. | | 244/12.4 |
| 2010/0025526 A1* | 2/2010 | Lawrence | | 244/17.23 |

OTHER PUBLICATIONS

Choi, Charles Q.; Electric Icarus: NASA Designs a One-Man Stealth Plane; Scientific America, Jan. 19, 2010.

* cited by examiner

|  | Current State-of-the-Art Performance |
|---|---|
| • High-efficiency tilt rotor airframe using optimum speed tilt rotor (OSR) technology and all-carbon, low empty weight-fraction structure: |  |
|   - lift/Drag (L/D) ratio (airplane mode) | ≥14 |
|   - empty weight fraction (including airframe, rotors, gearboxes, electric propulsion motors, inverter/controllers, radiators, but excluding electric power supply from batteries, converters, cruise power augmentation, and fuel tanks) | ≤0.50 |
|   - tilt rotor hover figure of merit | ≥0.76 |
|   - hover download | ~5% |
|   - rotor efficiency in propeller mode | ~85% |
| • Motors and inverter/controller combined (oil cooled, 95°C) |  |
|   - specific power (4-minute emergency) | ≤0.35 lbs/shp output |
|   - power/RPM range sweet spot efficiency (50-95% power) | 90% |
| • Batteries[1] |  |
|   - mass energy density | 200[2]-300[3] 400[4] usable W-hr/kg |
|   - mass power density 4-minute rating | 500-2000 W/kg |
|   - deep discharge life cycles to 80% original capacity | 5000 |
| • Fuel cells @ sea level |  |
|   - mass power density | 1 kW/kg |
|   - life @ 2/3 rated power | 5000 hrs |
|   - $H_2$ fuel energy conversion efficiency to DC electric power | 50% |
| • Turbine |  |
|   - power density @ sea level | ≤0.20 lbs/shp output |
|   - JP-8 specific fuel consumption | ≤0.45 lbs/shp-hr output |
| • Generator and rectifier (4-minute rating) | ≤0.22 lbs/kW output |
| • High pressure gaseous storage (5,000-15,000 psi) as fraction of full tank weight with 2.25 safety factor |  |
|   - for $H_2$ | ≥10% |
|   - for natural gas | ≥50% |
| • JP-4, 5, 8 or gasoline as fraction of full tank weight | 90% |
| • Installation weight added to energy supply package | 11% |

Battery Footnotes:
1) Potential inclusions in the energy supply package, depending on configuration
2) State-of-the-art in development ≥200 usable W-hrs/kg at the cell level
3) State-of-the-art in bench chemistry ≥300 usable W-hrs/kg
4) Projected state-of-the-art by Sion ≥400 usable W-hrs/kg

Figure 3

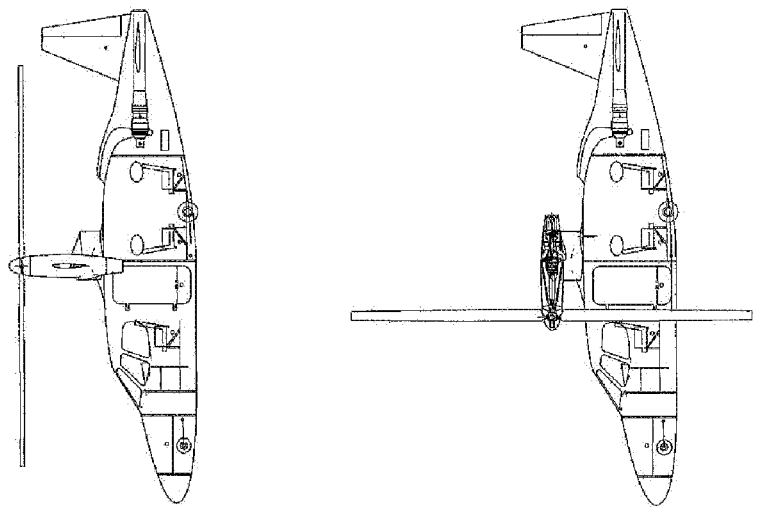
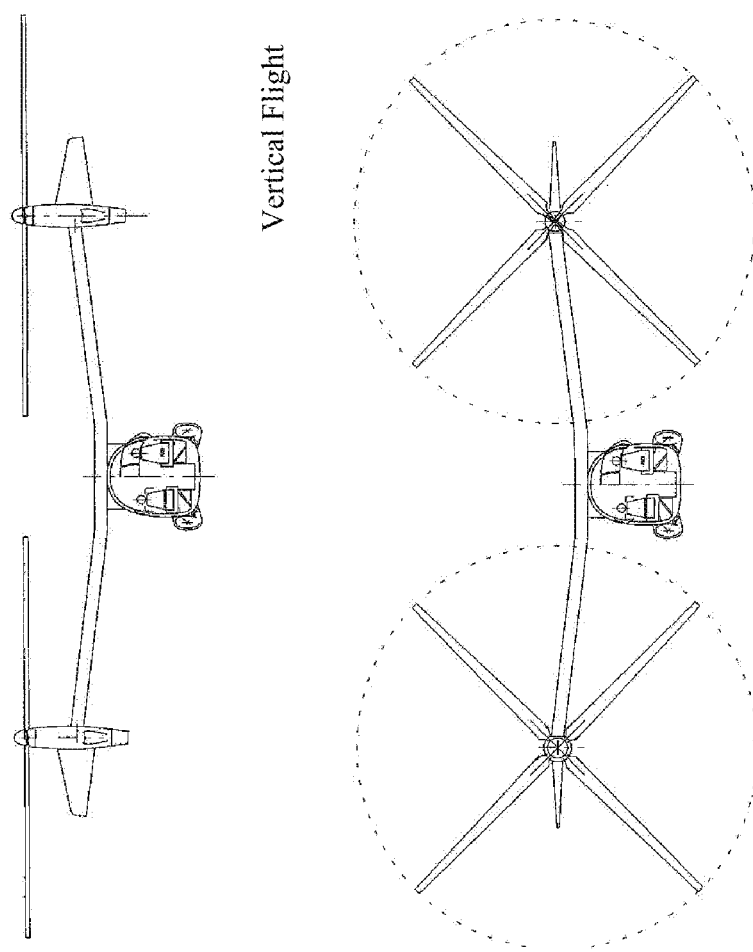
Vertical Flight    Horizontal Flight
Figure 5

| Weight Breakdown Table | Wt (lbs) | Masses (kg) | Fraction of Gross | Criterion |
|---|---|---|---|---|
| AIRFRAME | 2,122.0 | | 29.1% | |
| Airframe Structures | 1,700.9 | | 23.3% | |
|   Wing group | 576.7 | | 7.9% | Strength for rotor, stiffness for speed, composite |
|   Empennage group | 65.7 | | 0.9% | Low surface loading |
|   Fuselage group | 598.6 | | 8.2% | Foam-cored 3 piece composite |
|   Pressurization penalty | 109.5 | | 1.5% | Add'l bulkheads, 2 longerons, fore and aft caps |
|   Alighting gear group | 255.5 | | 3.5% | Intermediate stroke, appropriate weight class |
|   Nacelle structure | 94.9 | | 1.3% | Load transferring, includes trunnion |
| Airframe Controls | 262.8 | | 3.6% | |
|   Control actuation group | 65.7 | | 0.9% | Non-geared electric actuation |
|   Flight management group | 29.2 | | 0.4% | |
|   Electrical power distribution | 109.5 | | 1.5% | Aluminum high voltage distribution, redundant |
|   De-icing | 43.8 | | 0.6% | Based on wing / rotor leading-edge area |
|   Steerable taxi wheel drive | 14.6 | | 0.2% | Twin motor system |
| Accommodations | 158.3 | | 2.2% | |
|   Furnishings & equipment | 78.0 | | 1.1% | Business jet type comfort level (6 seats) |
|   Sound proofing | 14.6 | | 0.2% | |
|   Environmental control | 65.7 | | 0.9% | Pressurization and climate control |
| PROPULSION | 1,207.2 | | 16.5% | |
| Rotor Module Group | 503.7 | | 6.9% | |
|   Rotors and Hub | 365.0 | | 5.0% | Steel/Titanium hub, carbon-fiber blades |
|   Rotor actuation | 65.7 | | 0.9% | Brushless, Permanent Magnet |
|   Rotor gearbox | 73.0 | | 1.0% | Minimal stages, works over RPM range |
|   Cross drive | 0 | | 0.0% | |
| Electric Propulsion | 703.5 | | 9.6% | |
|   Drive motors & power conditioning | 396.8 | | 5.4% | 2x3/nacelle=6 @ 90 skW each=540 skW contin. |
|   Radiators | 36.5 | | 0.5% | Gear reduction section and PM motor cooling |
|   Coolant & lube | 14.6 | | 0.2% | Estimate of liquids in circuit |
|   Nacelle actuation | 51.1 | | 0.7% | Geared reduction drive |
|   Elec. Cables charger, switch panels | 204.5 | | 2.8% | |

Table Continued in Figure 9B

Figure 9A

| Weight Breakdown Table (Continued) | Wt (lbs) | Masses (kg) | Fraction of Gross | Criterion |
|---|---|---|---|---|
| CONTINGENCY | 177.5 | | 2.4% | |
| EMPTY (excluding energy power pack & installation) | 3,506.7 | | 48.0% | |
| USEFUL LOAD | 3,793.3 | | 52.0% | |
| PAYLOAD (Occupants & baggage or cargo) | 1,200.0 | | 16.4% | 6 occupants x 200 lbs each |
| ENERGY/POWER PACK | 2,334.0 | 1058.5 | 32.0% | 90% of Useful Load minus payload |
| Battery | 661.5 | 300.0 | | 40 kWhrs @ 133 W-hrs/kg usable @ 2 kW/kg |
| Turbine or I.C. Engine Pack + gearbox | 255.0 | | | 950 shp (including 65 lb reduction gearbox) |
| Conversion Electrical Generator | 130.0 | | | 600 kW (4 minutes), 400 kW continuous |
| Fuel Cell | 0 | | | |
| Fuel Tank (special) | 0 | | | |
| Fuel | 1,266.5 | | | |
| Radiator | 36.5 | | | |
| Coolant Lube | 14.6 | | | |
| ENERGY PWR PACK INSTALLATION | 259.3 | | 3.6% | 11.1% of power pack |
| VEHICLE GROSS WEIGHT | 7,300.0 | | 100% | |

Figure 9B

Note: Same aircraft and rotor propulsion motors applicable to heavy hybrid and purebred energy power pack Design Points for HOGE:
- Individual Rotor Diameter (2) = 26.6 ft (2 x four-blade rotors)
- Total Disk Area (2rotors) = 2 x 555.7 sq ft = 1111.4 sq ft
- Total Max Continuous Power = 724 shp = 540 skW from 6 x 90 skW motors
- Total Max Emergency Power = 1085 shp = 810 skW from 6 x 90 x 1.5 skW motors
- Installed Generator Output Power 600 kW when applicable

|  | HOGE Conditions Alt (ft)/Temp (°F) | HOGE Weight (lbs) | Disk Loading (lbs/sq ft) | Power Loading (lbs/shp) |
|---|---|---|---|---|
| Army Very High/Hot | 6k/95 | 6,318 | 5.68 | 8.73 |
| Army High/Hot | 4k/95 | 6,560 | 5.90 | 9.06 |
| Navy Sea Level/Hot | SL/103 | 7,000 | 6.30 | 9.67 |
| Sea Level/Standard | SL/59 | 7,300 | 6.57 | 10.08 |

Figure 10

| Surface | Wetted Area (sq ft) |
|---|---|
| Fuselage | 465.7 |
| Land Gear Fairings x 2 | 59.4 |
| Nacelle x 2 | 59.0 |
| Horizontal x 2 | 38.6 |
| Vertical | 20.7 |
| Wing (inner) x 2 | 270.0 |
| Wing (outer) x 2 | 61.3 |
| TOTAL | 974.7 |

$$\frac{Wing\ Span}{\sqrt{Wetted\ Area}} = \frac{49.6}{31.2} = 1.59$$

Figure 11A

PUREBRED AND HYBRID ELECTRIC VTOL TILT ROTOR AIRCRAFT

This application claims the benefit of priority to U.S. provisional application having Ser. No. 61/147,499 filed on Jan. 27, 2009. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is tilt rotor aircraft technologies.

BACKGROUND

Currently available vertically capable aircraft (VTOLs) are generally denied permission for routine powered terminal operations (e.g., take-off, low altitude climb, landing, etc.) in populated, built-up areas for one or more of four reasons: safety, noise, exhaust emissions, or outwash velocity. Further, current rotary-wing VTOLs, except for very advanced tilt rotor aircraft, cannot compete with similar payload-class, fixed-wing, propeller-driven aircraft in speed and range when unrestricted expansive take-off and landing facilities and climb corridors are conveniently available at both ends of a mission. So the simultaneous attainment of radically improved terminal safety, tolerable noise and fumes, modest outwash velocity and competitive fixed-wing speeds, efficiencies, and ranges would enable rotary-wing aircraft to dominate the current light aircraft market, subject to price differentials, and open up the vast denied market for terminal operations in built-up areas. Two other factors, though not essential to correct the above rotary-wing shortfalls, add to the market expansion potential for the subject electrically-powered rotor craft: (1) independence from logistically burdensome fuels (e.g., JP, $H_2$, etc.) at light-duty bases, particularly in built-up areas, and (2) fully autonomous flight control/management to relieve the stiff requirement for specialized pilot proficiency, thus eliminating another disincentive for vertical aircraft ownership/operation.

Although numerous low-performance electric fixed-wing aircraft have been built, the only widely publicized claims to an electric tilt rotor aircraft are made by FALX AIR™ Hybrid Tilt Rotor. To the degree that popular descriptions are accurate: (1) the configuration is a low aspect ratio tilt-wing, not a tilt-rotor; (2) the batteries in the FALX AIR are supplemental to the internal combustion engine to assist Hover-Out-of-Ground-Effect (HOGE) and climb and do not provide separate full HOGE power; hence, the FALX AIR lacks fully redundant power in the dead man zone for silent, safe takeoff and landing in built-up areas; (3) the dual electric motors/nacelle are insufficient at this moderately high disk loading to supply HOGE with one-propulsion-motor-inoperative (OPMI), thus severely compromising safety in built-up areas; and (4) the FALX AIR makes no pretense of basing-independence allowing all-electric operation for basing in the absence of conventional logistic fuels.

Similarly, the Aurora Flight Science's™ Excalibur concept VTOL electric hybrid is not a tilt-rotor configuration, but rather a direct thrust turbofan, 70% of vertical lift, with supplemental electric ducted fan lift during HOGE.

Four recent advances in disparate technologies can synergize to enable efficient electric tilt-rotor VTOL aircraft. Tilt-rotor aerodynamic, structural, and propulsive efficiencies have improved. Extremely flight-efficient tilt-rotor aircraft, far beyond the V-22's anemic lift-to-drag ratio, low propulsion efficiency, and high structural weight fraction result in more than 2× the V-22's specific payload×range. Electric motor power densities have increased. High-performance, light-weight electric motors and generators can have more than three times the power-density of motors being introduced in electrically propelled automobiles. Battery energy densities have also increased and can provide energy densities of 100, 200, 300, or even up to 400 W-hrs/kg. Furthermore, autonomous flight control and management systems have dramatically improved. For example, autonomous flight control and route/ATC management with pilot override, which allow for totally autonomous flight from takeoff to landing have been demonstrated in the A-160 Hummingbird.

All of the above individual subsystem elements for a new electrically-powered tilt-rotor VTOL (E-VTOL) have already been separately demonstrated: (1) Hardware has been demonstrated with prototypes of very high performance electric motors/generators, small/light/low-sfc turbines, moderately high performance lithium batteries, variable speed rigid rotors, light weight all-carbon structures, and autonomous flight/management of rotary wing VTOLs. (2) Extensive vetting by independent parties of related aerodynamically efficient tilt-rotor airframe designs (though not with electric propulsion architectures) has testified as to the practicality of the assumed aerodynamics and weights. (3) Finally, the very high-performance lithium batteries necessary for the purebred battery electric architectural variant are at the bench chemistry stage within the National labs and less visibly with private firms, thus developable with expected vigor.

What has yet to be appreciated is that the above advances can now be combined to realize many new capabilities that address issues with the known art. The contemplated E-VTOL aircraft have tolerable noise, zero emissions, or acceptable outwash velocity necessary for powered terminal operations in populated, built-up geography. An E-VTOL aircraft has vertical flight safety improvements to bring rotary-wing aircraft into parity with fixed-wing competitors (e.g., factor of 10 reductions in accidents per flight-hour) and makes vertical flight politically compatible with terminal operations in built-up areas, such as elimination of the "dead man's zone". Electrically-powered, vertically-capable aircraft can have market-competitive speed and range relative to current personal, executive, light cargo, public safety, and military fixed-wing, propeller-driven aircraft below 20,000 lb gross weight. Such aircraft also have the benefit of basing-independence from conventional on-site liquid fossil fuel support for short range operations where only electrical power would likely be required for recharging batteries. The aircraft also have naturally low infra-red and acoustic signature in terminal operations where combat threats are most prevalent. Contemplated designs also eliminate a requirement for a two-speed gearbox or mechanical cross shafting that would ordinarily be necessary for optimized vertical lift, horizontal cruise rotor RPM, and safe vertical terminal operations when separate rotor nacelles are driven by conventional turbine engine mechanical drive trains. Designs can also include non-tilting sustainer engines in the electric hybrid which avoid lubrication problems and engine design specialization in typical "engine-in-nacelle" tilt-rotor aircraft. Additionally electric hybrid VTOL (E-VTOL) have a wide flexibility in choice of sustainer energy source types or sizes within the same airframe to suit the desired cruise speed and altitude with no change in rotor electric drive motors which are sized for vertical flight and hence over-powered for all but highest speed cruise.

The above advanced capabilities can be achieved using multiple electric motors to drive each rotor through one or more fixed reduction gearboxes and a choice of at least three power supply architectures, all of which enable full redundancy in both rotor drive motors and electric power supply for safe, hover-out-of-ground-effect (HOGE) in built-up areas. All three are purely electric during quiet, emission-free operations in built up areas. A heavy hybrid can be entirely electric, hence basing-independent, for short range operations (e.g., less than 50 nautical miles). A purebred battery architecture can be innately all-electric for full flight range (e.g., greater than 200 nm). A light hybrid offers full range (e.g., on the order of 1000 nm) flight, but can require traditional logistic fuel availability under normal basing conditions even though it retains quiet, safe, all-electric terminal operations capability. All designs benefit from fully autonomous flight control with pilot override to reduce or eliminate pilot skill requirements and further improve safety of this inherently complex vertical lift aircraft.

Therefore, there remains a considerable need for methods, systems, and configurations for providing VTOL tilt-rotor aircraft.

SUMMARY OF THE INVENTION

The inventive subject matter provides apparatus, systems and methods in which a vertical takeoff and landing (VTOL) aircraft is configured to achieve hover-out-of-ground-effect (HOGE) while under the power of an electrical motor. One aspect of the inventive subject matter includes a VTOL heavier than air aircraft that includes one or more electrical motors coupled to one or more rotors. The aircraft also includes one or more electrical energy stores (e.g., a battery, fuel-cell, etc.) that can drive the motors. Preferably an electrical energy store can be configured to deliver at least 100 W-hrs/kg, more preferably at least 200 W-hrs/kg, yet more preferably at least 300 W-hrs/kg, and even more preferably at least 400 W-hrs/kg. Such aircraft can achieve HOGE for at least four minutes while under power of at least one electrical motor and while carrying a payload of at least 50 pounds. In more preferred embodiments, the aircraft can achieve HOGE while carrying at least 100 pounds, yet more preferably at least 1000 pounds, and even more preferably at least 3,500 pounds. In some embodiments, the electrical energy store can comprise a rechargeable battery. It is also contemplated that the battery could be repositioned to adjust the center of gravity of the aircraft.

The aircraft can also incorporate one or more sustainer energy/power sources capable of supplying electrical power to the motors. Example sustainer energy/power sources can include a fuel driven engine and generator, a fuel cell, a semi-cell, or other sources of electrical power.

One should appreciate that contemplated VTOL aircraft can include a plurality of electrical motors. In some embodiments, the VTOL aircraft can include multiple electrical motors coupled to respective rotors. Preferably, the electrical motors can support fail-over operation where a first motor can service a second motor's rotor while the second motor is inoperative. In such embodiments the aircraft can achieve HOGE with one propulsion motor inoperative (OPMI). The motors can be deployed within tiltable nacelles, each nacelle having a corresponding rotor. It is also contemplated that the nacelles could house one, two, or more additional redundant motors.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 3 represents a table listing desirable market-competitive performance parameters for various elements of a VTOL aircraft.

FIG. 5 presents views of a possible VTOL aircraft when in vertical flight and horizontal flight.

FIG. 9A represents a table outlining a weight breakdown of a contemplated light hybrid airframe VTOL aircraft.

FIG. 9B is a continuation of the table in FIG. 9A.

FIG. 10 represents a table of Hover-Out-of-Ground Effect (HOGE) performance.

FIGS. 11A and 11B present example wetted area and a graph illustrating approximately the lift-to-drag of a possible VTOL aircraft relative to other existing aircraft.

DETAILED DESCRIPTION

Figure 1A:
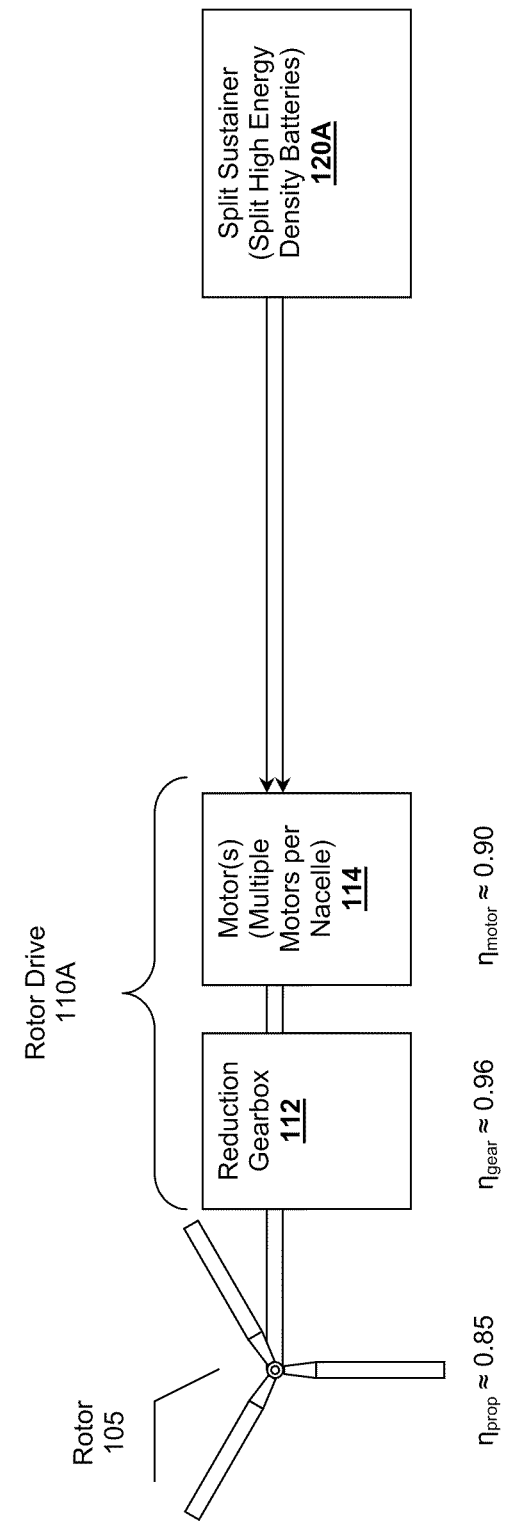
FIG. 1A presents a schematic of a possible all battery purebred propulsion architecture.

The present inventive subject matter is drawn to systems, configurations, and methods of providing numerous advances to VTOL tilt-rotor aircraft, especially electrically driven VTOL (E-VTOL).

The disclosed subject exploits advanced electric propulsion in concert with highly efficient, autonomously piloted with pilot override Vertical Take-Off and Landing (VTOL) tilt-rotor aircraft to radically expand the safe, legal, and practical ingress, egress, and basing into, out of, or within populated, built-up locales, and to achieve speeds and ranges competitive with current fixed wing, propeller-driven aircraft of the same payload class. While less efficient rotary wing aircraft (e.g., helicopters and compounds) also benefit from the electric propulsion in terms of safety and legality (e.g., noise or exhaust emissions requirements), their innately lower lift-to-drag ratios prevent them from competing with fixed-wing, propeller-driven aircraft in speed and range.

Understanding the Concept

The inventive subject matter encompasses at least three fundamentally different electric propulsion architectures (e.g., purebred battery; light hybrid; and heavy, basing-independent hybrid, etc.) which, when mechanized on advanced, high-efficiency tilt-rotor vertical takeoff and landing (VTOL) aircraft, substantially expand the performance envelope, safety, or basing options over that currently available with conventional helicopters and fixed wing aircraft against which the electric tilt-rotor must compete.

An example VTOL aircraft that could be adapted to benefit from the disclosed techniques could include the U.S. Government baseline High Efficiency Tilt Rotor (HETR) design based on an Optimum Speed Tilt Rotor (OSTR) system as described in U.S. Pat. No. 6,641,365 to Karem titled "Optimum Speed Tilt Rotor" and industry designs revealed in a Joint Heavy Lift (JHL) Intra-Theater Cargo Vertical Aircraft competition. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Table 1 summarizes various architectures of the contemplated designs.

TABLE 1

| | Silent, Clean Terminal Operations Energy Store | Small Battery Energy Store for Basing-Independence and 50 nm All-Electric Range | Sustainer Electric Power Generator for Cruise | Sustainer Energy or Fuel Store |
| --- | --- | --- | --- | --- |
| Purebred Electric | provided by Sustainer battery | provided by Sustainer battery | provided by sustainer battery | split high energy density rechargeable battery |
| Electric rotor drive heavy hybrids | provided by ≧50 nm battery | split high energy-density rechargeable battery | engine/generator, electric fuel cell, or electric semi-cell | gaseous, liquid, or solid replenishable fuel |
| Electric rotor drive light hybrids | split high energy density rechargeable battery for takeoff, climb, and landing only | Not Applicable | engine/generator, electric fuel cell, or electric semi-cell | gaseous, liquid, or solid replenishable fuel |

Figure 1B:
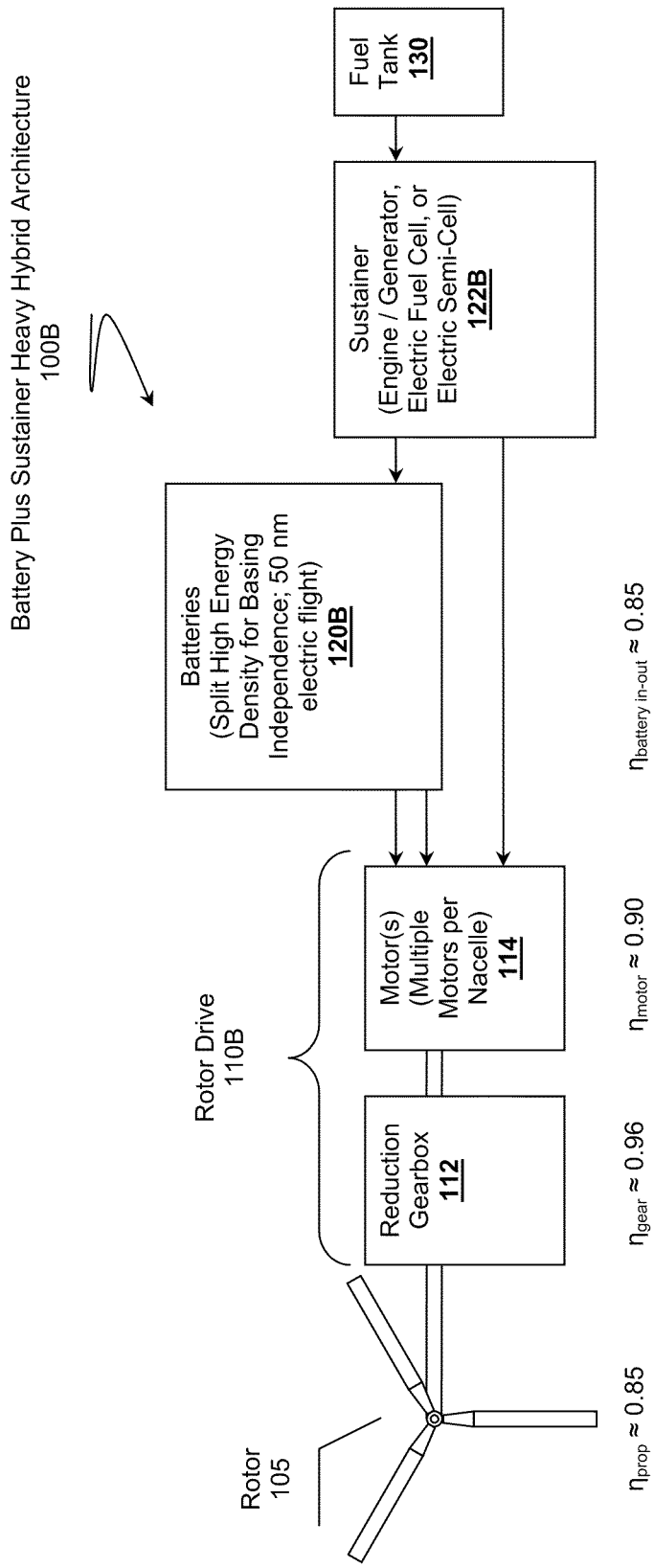
FIG. 1B presents a schematic of a possible "battery plus sustainer" heavy hybrid propulsion architecture.
Figure 1C:
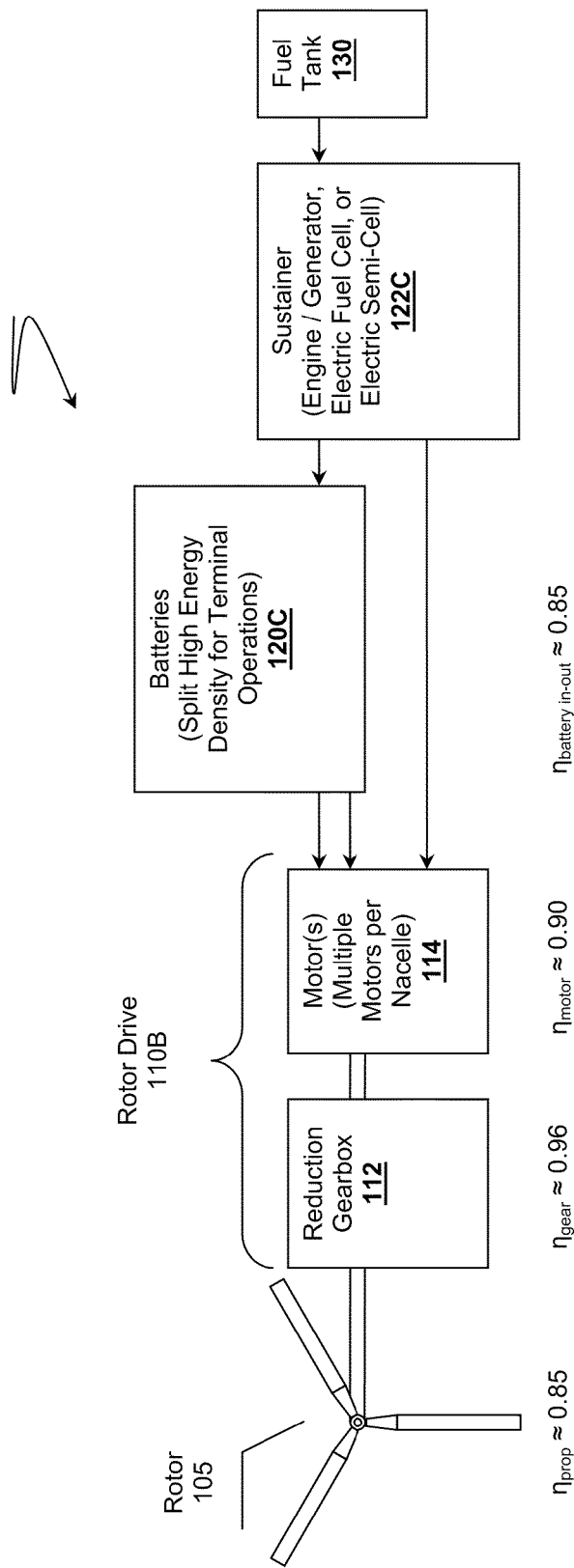
FIG. 1C presents a schematic of a possible "battery plus sustainer" light hybrid propulsion architecture.

FIGS. 1A, 1B, and 1C illustrate several different notional electric propulsion architectures with nominal subsystem efficiencies.

In FIG. 1A, propulsion system 100A represents an all battery purebred design. System 100A can include an electrical energy source as represented by split section battery 120A, which electrically couples to one or more of motors 114. Preferably battery 120A comprises one or more high energy density batteries, possibly having split sections for failure isolation. Motors 114 are mechanically coupled to reduction gearbox 112, which in turn couple to rotor 105. Naturally, it should be appreciated that rotor 105 and motor 114 are configured to produce a thrust force counter to the weight of the aircraft. As illustrated, the efficiencies of the system components are relatively high. As discussed further below, the contemplated configuration can provide for an E-VTOL capable of achieving HOGE for at least four minutes while carrying a payload of at least 50 pounds. Various configurations provided below also provide for carrying payloads in excess of 100, 200, 500, 1000, 3000, or even 3500 pounds.

In FIG. 1B, propulsion system 100B has similar components to system 100A of FIG. 1A, with the addition of a sustainer power source 122B. System 100B represents a battery plus sustainer heavy hybrid design. Sustainer 122B represents a source of additional electric power capable of driving one or more of motors 114. An additional sustainer 122B can electrically coupled to batteries 120B. Sustainer 122B can be fueled from fuel tank 130. The contemplated design allows for basing independence and up to 50 nm pure electric flight without requiring additional sustainer assistance. In such embodiments, electrical energy store 120B can comprise a rechargeable battery that can be recharged from sustainer power source 122B, even during flight. It is also contemplated that battery 120B could be repositionable within the aircraft, possibly to provide adjustment for the aircraft's center of gravity.

Sustainer power source 122B can take on many different forms. In some embodiments, sustainer 122B can include a fuel driven combustion engine powering an electric generator. Sustainer 122B can also include one or more fuel-cells or electric semi-cells. One should also appreciate that sustainer 122B can also comprise combinations of various additional electrical power sources.

In FIG. 1C, propulsion system 100C is similar to system 100B, with the exception that the system represents a battery plus sustainer light hybrid design. As with system 100B, sustainer 122C couple to batteries 120C providing optional recharge of batteries 120C in addition to providing power directly to electric motors 114. Alone Batteries 120C can provide sufficient power for terminal operations (e.g., taking off, landing, maneuvering, low altitude climb, etc.).

Myriad high energy density batteries are currently available having a wide variety of applications. Such battery technologies can be adapted for use within the disclosed subject matter. Example batteries can include the BA 5590 Li—$SO_2$ battery produced by Saft™, Inc having an energy density 250 W-hrs/kg. Another example battery can include the BA 7847 Lithium-Manganese Dioxide battery having an energy density of 400 W-hrs/kg offered by Ultralife Batteries™, Inc. It is also contemplated that Lithium-air exchangeable recyclable primary batteries based on Lithium perchloride could supply energy densities in excess of 1000 W-hrs/kg, where such batteries have a theoretical energy density greater than 3000 W-hrs/kg as discussed in "Lithium Primary Continues to Evolve" by Donald Georgi from the $42^{nd}$ Power Sources Conference, June 2006. One should appreciate that configuration of such commercially available batteries or configuration of other existing battery technologies for use within contemplated VTOL aircraft is considered to fall within the scope of the inventive subject matter. For example, it is also contemplated that automotive plug-in hybrid can be adapted for use with in the inventive subject matter. The batteries representing the electrical energy store of the VTOL aircraft can also be configured to be field-replaceable for ease of maintenance. Thus, a VTOL aircraft could carry one or more spare batteries that can be swapped with a failed or failing battery in the field during a mission without requiring a maintenance facility.

The previously discussed propulsion systems can be applied to numerous types of aircraft markets. In a preferred embodiment, the propulsion systems can be directly applicable to rotary wing and fixed wing aircraft markets. For example, general aviation (e.g., personal, light business, executive business, public safety, light military, light charter, and light cargo class with 1-14 total seats or at least 3500 lbs payload) aircraft would benefit from such designs by reducing noise, emissions, or other undesirable characteristics. Additionally, unmanned aviation with a gross weight of less than 20,000 lbs could leverage the disclosed techniques.

Table 2 lists desirable cruise speeds and ranges for current fixed-wing general aviation markets. The disclosed designs provide complementary capabilities for an E-VTOL aircraft.

TABLE 2

|  | Cruise Speed | Range w/Powered Vertical Landing Reserves |
| --- | --- | --- |
| Personal | >165 kts | >200 nm |
| Light Business | >210 kts | >800 nm |
| Executive Business | >300 kts | >800 nm |
| Light Charter | >340 kts | >800 nm |

FIGS. 2A, 2B, 2C, and 2D illustrate driveline options having various degrees of redundancy. The contemplated configurations can provide for achieving HOGE with one propulsion motor inoperative (OPMI), with the exception of the design presented in FIG. 2D.

Figure 2A:
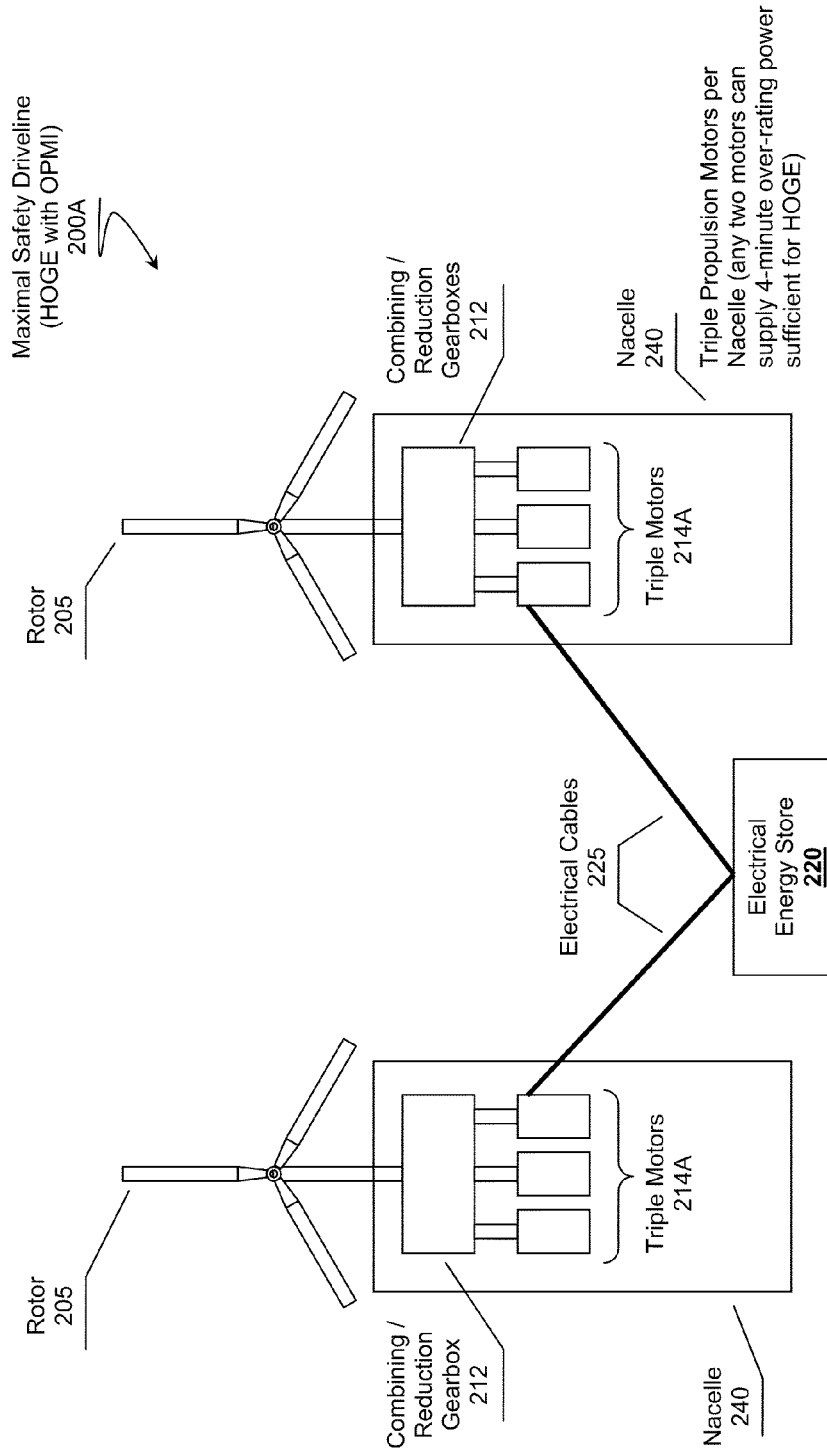
FIG. 2A presents a schematic of a possible maximal safety driveline having three motors per nacelle.

In FIG. 2A driveline system 200A can comprise two of nacelles 240, each housing three motors 214A and combining/reduction gearbox 212, which in turn couple to rotors 205. In such an embodiment, energy source 220 can supply triple propulsion motors 214A with sufficient continuous power over cables 225 to achieve HOGE for at least four minutes. One should also note that the additional motors 214A in nacelles provide redundancy to allow HOGE to be achieved while under OPMI. The configuration shown in FIG. 2A is considered to have a maximal safety driveline due to motor redundancy. Other configurations are also contemplated. As noted in FIG. 2A each of propulsion motor 214A can have a co-located inverter/controller.

Figure 2B:
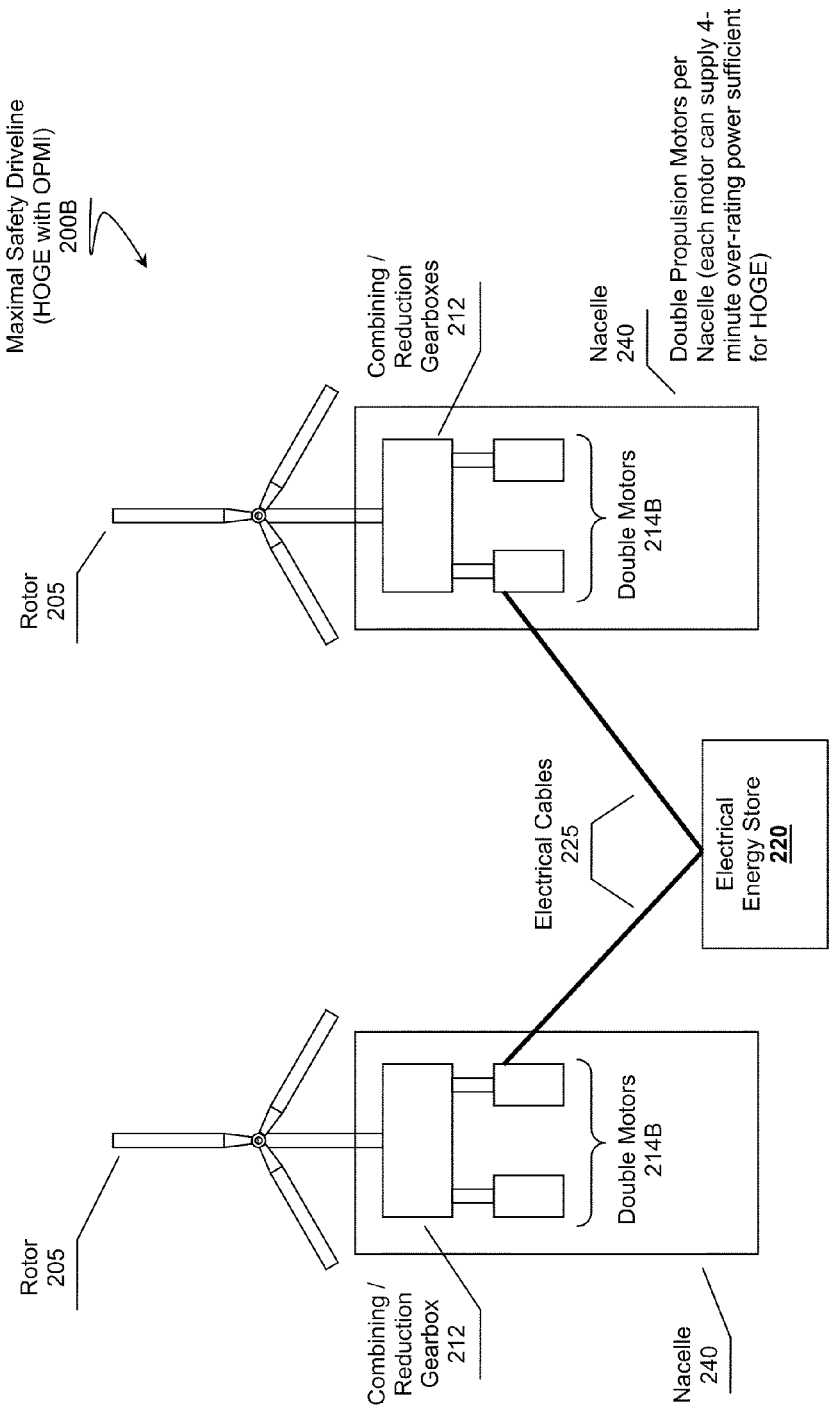
FIG. 2B presents a schematic of a possible maximal safety driveline having two motors per nacelle.

FIG. 2B provides an alternative configuration to that of FIG. 2A. Rather than having three motors per nacelle 240, driveline 200B comprises double motors 214B per nacelle. This configuration also has redundant motors, while preferably requiring that each of motors 214B have sufficient capabilities to achieve HOGE under desirable conditions. Although likely having less safety than driveline 200A depending on the capabilities of motors 214B depending on the aircraft's design parameters, driveline 200B is also considered to have maximal safety. One skilled in the art will appreciate that selection of motors 214B depends on the class or requirements of the VTOL aircraft being built.

Figure 2C:
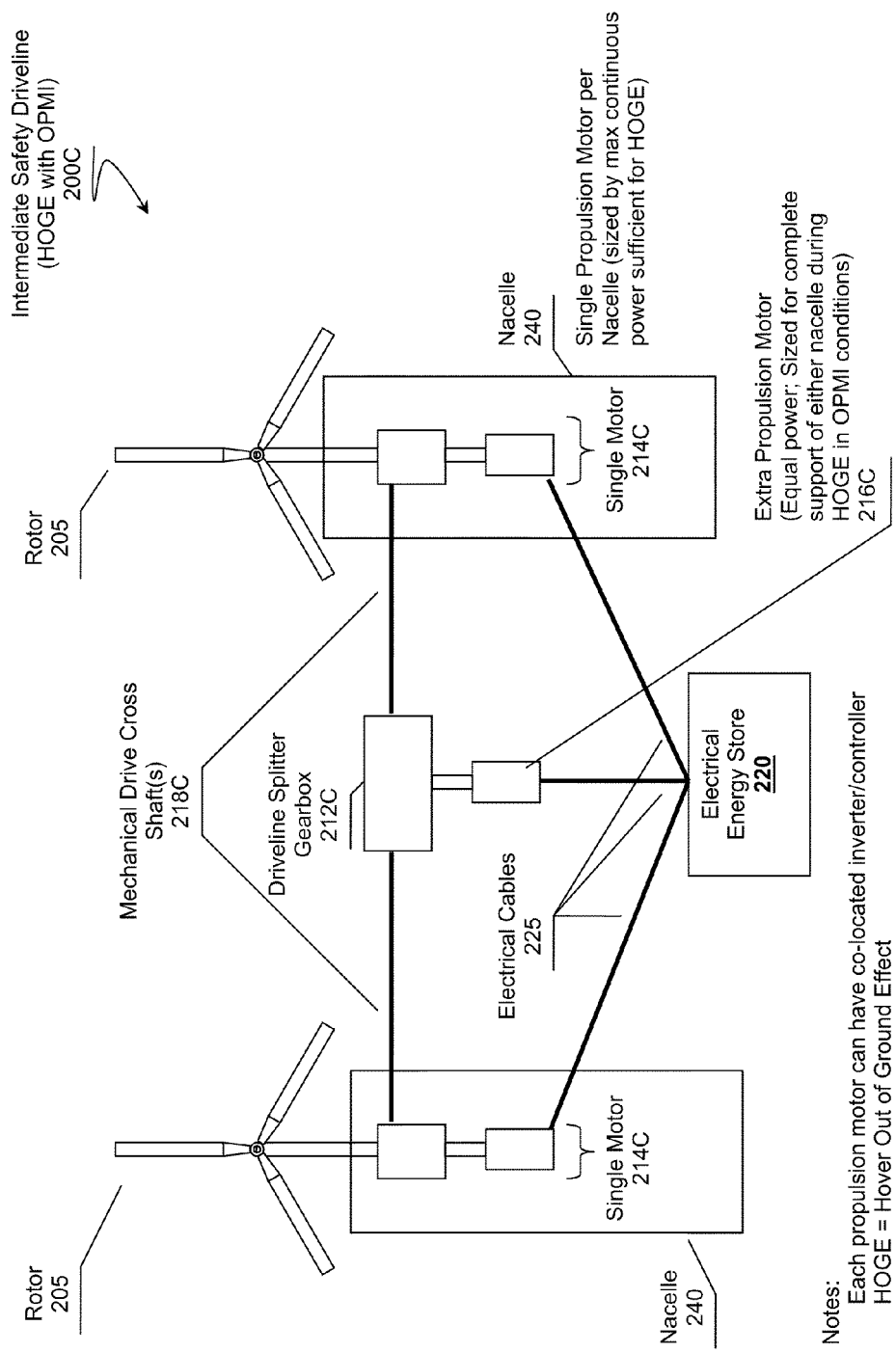
FIG. 2C presents a schematic of a possible intermediate safety driveline having one motor per nacelle and an extra propulsion motor.

FIG. 2C presents possible driveline 200C considered to have an intermediate level of safety, while still being able to achieve HOGE under desirable conditions. Driveline 200C includes a single motor 214C per nacelle where each of the propulsion motors is sized to deliver sufficient power for HOGE. An extra propulsion motor 216C is also included, possibly disposed between the nacelles in a wing or fuselage of the aircraft. Motor 216C also electrically couples to electrical energy source 220 via an electrical cable 225. Motor 216C can also mechanically couple to rotors 205 via drive cross shafts 218C. Extra propulsion motor 216C preferably has at least equal power to that of motors 214C to ensure that HOGE can be achieved in OPMI conditions even when one of motors 214C are inoperative.

Figure 2D:
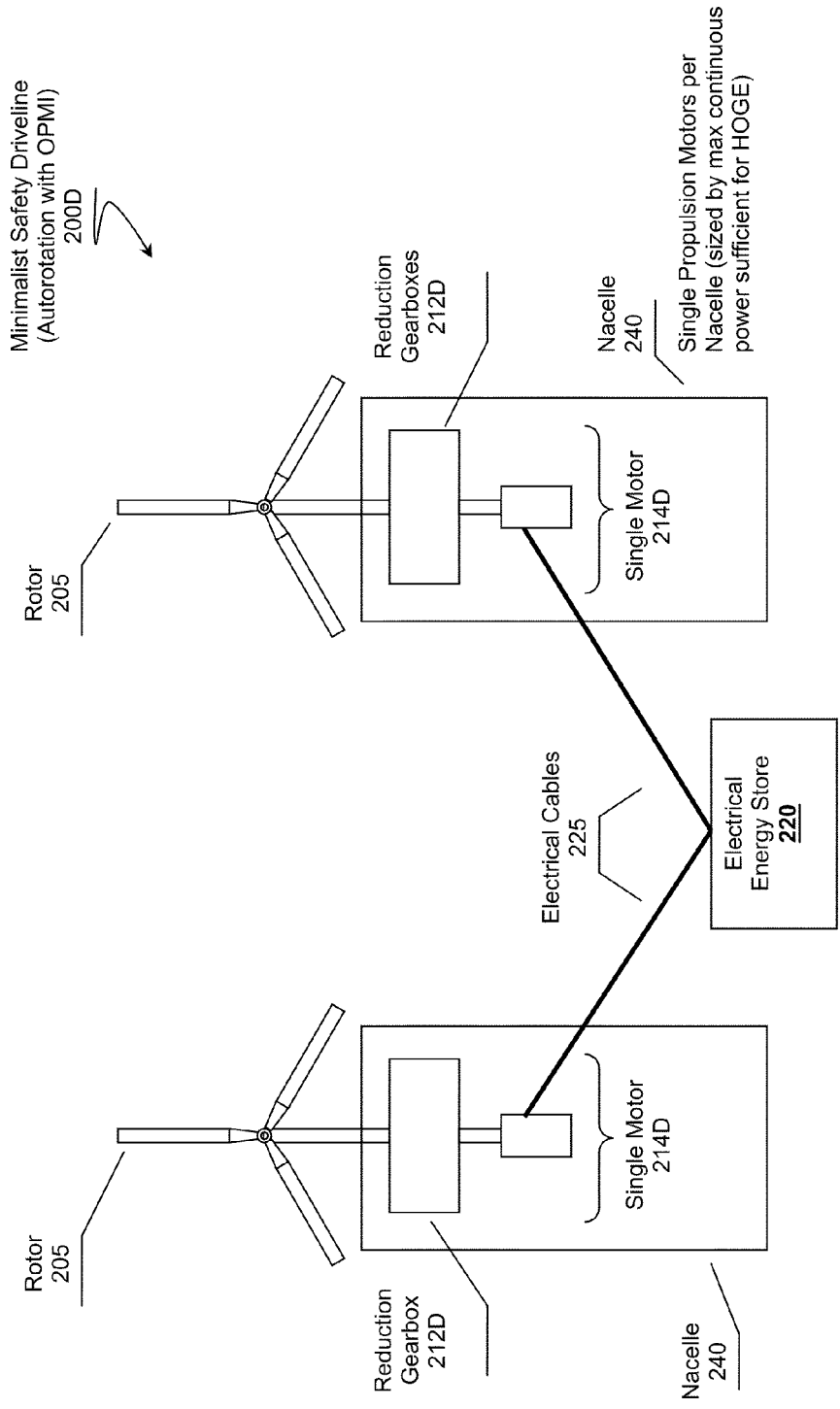
FIG. 2D presents a schematic of a possible minimalist safety driveline having one motor per nacelle.

FIG. 2D illustrates driveline 200D, which is considered to have a minimalist safety approach. While motors 214D can provide HOGE under desirable conditions, OPMI is expected to be achieved with autorotation. As illustrated, only one of motor 214D is housed within nacelles 240, where motors 214D drive rotors 205 via reduction gearboxes 212D.

The above four driveline options are presented to illustrate various design possibilities afforded by an E-VTOL aircraft. One should appreciate that many other configurations for a driveline are possible, all of which are contemplated. Furthermore, one should note that the drivelines can lack cross shafts coupling the motors to the rotor, or lack a shifting gearbox as is typical in traditional combustion-based designs of efficient tilt rotors as opposed to inefficient tilt rotor aircraft (e.g., the V-22).

Combining the approaches outlined above for propulsion systems and drivelines confers many abilities or capabilities to an E-VTOL aircraft. By providing the ability to safely achieve HOGE while under electrical power, contemplated E-VTOL aircraft can be used or otherwise operate in built-up or populated arenas. The aircraft have low levels of noise and low level emissions. An all electric, quiet vertical propulsion system simply produces no unacceptable location emissions during vertical flight regime or initial climb.

E-VTOL aircraft based on the disclosed systems can provide for a market-viable purebred all-battery configuration, where the aircraft can have a range in excess of 200 nm with a vertical ascent within three minutes. Such an aircraft can also have descent and powered vertical landing reserves of at least one minute.

A heavy hybrid having a battery-only range in excess of 50 nm could operate locally to and from a logistically unsupported base. These bases are expected to provide electrical recharge energy to recharge the heavy hybrid's batteries.

Contemplated configurations also lack a requirement for a 2-speed gearbox normally required to efficiently match the large variation in required rotor RPM between hover and cruise operation modes due to poor turn-down fuel consumption of typical turbine-powered rotor with mechanical drive trains using fixed ratio gearboxes. Rather, the contemplated designs exploit the large turndown required in rotor RPM for cruise efficiency without a multi-speed gearbox.

The contemplated designs have safety exceeding that of conventional mechanical driveline rotary-wing aircraft. For example, the contemplated designs not only have a normal innate ability to provide safe auto-rotation upon loss of all drive power, the electrically propelled rotorcraft hybrids can descend for controlled battery-powered hover or vertical landing after loss of a sustainer energy/power source (e.g., larger batteries, fuel-cells, semi-cells, engine/generator, etc.). In a similar vein, hybrids can hover or land vertically using the sustainer energy/power source should the batteries become debilitated. The electrically propelled purebred battery-powered tilt-rotor or hybrid rotorcraft in battery mode can perform powered hover or vertical landing after partial battery debilitation because the batteries can be split into sections for electrical isolation of a failed battery section. The same reasoning applies to elimination of the dead man's zone during takeoff or landing, particularly in built-up areas.

Light propulsion motor weight (e.g., less than 0.35 lbs/shp 4-minute output) allows for installation of at least two full-lift power propulsion motors per nacelle. In some embodiments, a nacelle could house at least three half-lift power propulsion motors in each rotor nacelle without requiring mechanical cross-shafting to share load while under OPMI during terminal operations. Such an approach is considered advantageous in conditions where the dead man's curve or auto-rotation creates unacceptable risk in built-up areas. See FIGS. 2A through 2D for example motor-nacelle configurations.

Contemplated E-VTOL aircraft have altitude-independent maximum continuous power from electric propulsion limited by continuous power available from the batteries or from sustainer energy/power sources. E-VTOL aircraft lack a requirement for coupling rotor/propulsion motor RPM from a sustainer RPM if such a sustainer relies on rotating generators, thus simplifying design or implementation criteria. Additionally, the designs also eliminate a requirement for multiple axis thermal engine operation in hybrids, hence removing special design restrictions for multi-axis lubrication on typical nacelle mounted tilt rotor engines.

For operations in built-up areas with civilian personnel, the electric tilt-rotor will, as with other rotary wing aircraft, keep disk loading below 15 lbs/sq ft for outwash velocity reasons and rotor tip speed below Mach 0.7 at sea level in a standard atmosphere for acoustic reasons. Such a configuration allows for achieving HOGE while generating less than 40 dB of sound as measured by an observer on the ground 1,500 feet from the aircraft.

Bases of Performance

FIG. 3 presents a table that is considered to list market-competitive capabilities of viable E-VTOL aircraft. The inventive subject matter is thought to depend on the capabilities, which are experimentally demonstrated or thoroughly vetted state-of-the-art configurations, structures, electric propulsions, energy converters (where applicable), and energy storage (e.g., battery charge, high-pressure gaseous fuel, or solid or liquid fuel) or autonomous flight control/management.

Feasibility

In order to illustrate that the vehicle assemblage can be fabricated by one practiced in the art, Sierra Marine™, Inc., was contracted to configure an airframe which would accommodate the light hybrid energy source. The same airframe could also accommodate a heavy hybrid or an all-battery purebred.

Figure 4:
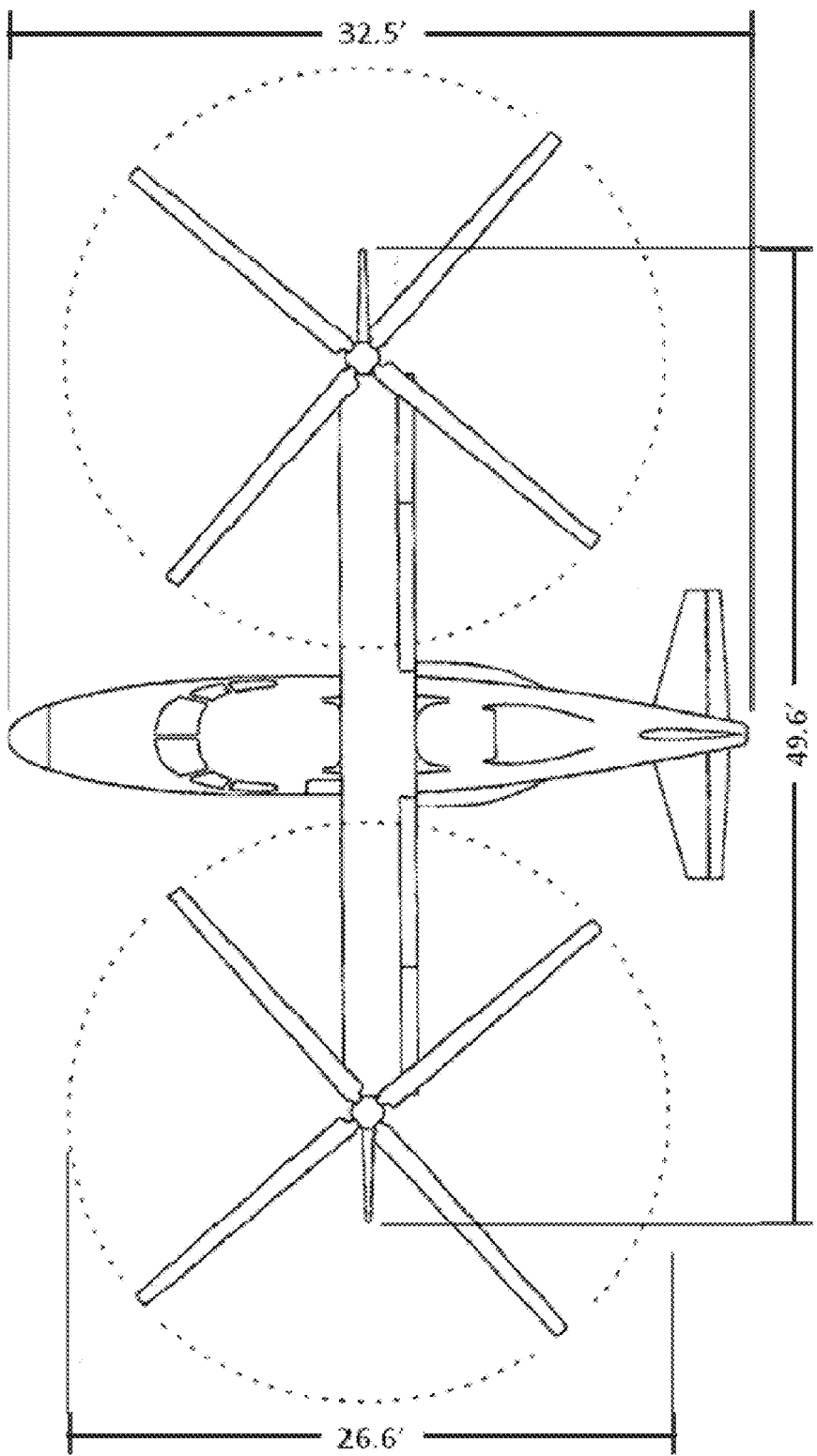
FIG. 4 presents a top view of a possible VTOL aircraft in hover mode.
Figure 6:
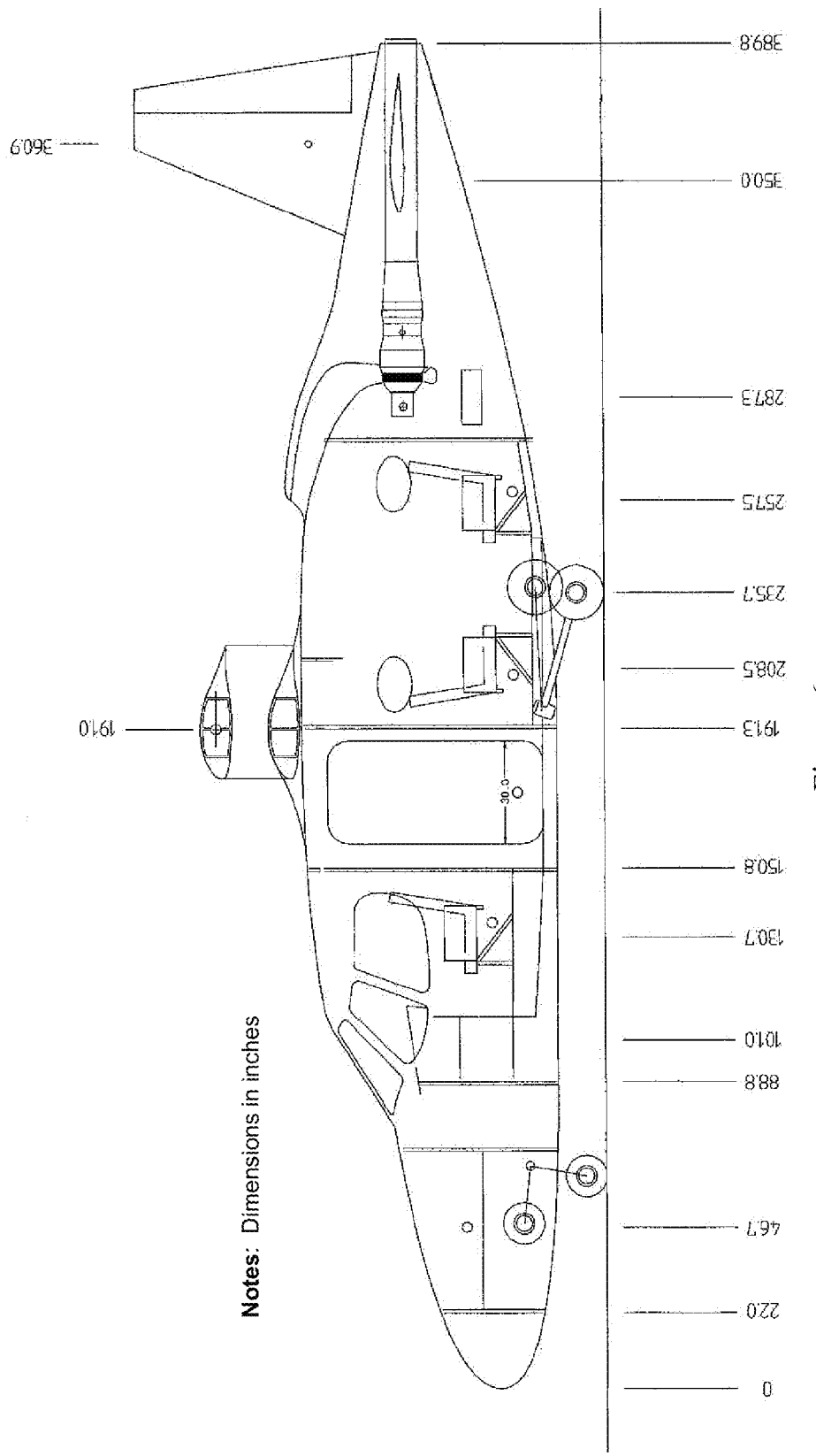
FIG. 6 presents a side view of a contemplated VTOL aircraft and illustrates possible internal arrangements.
Figure 7:
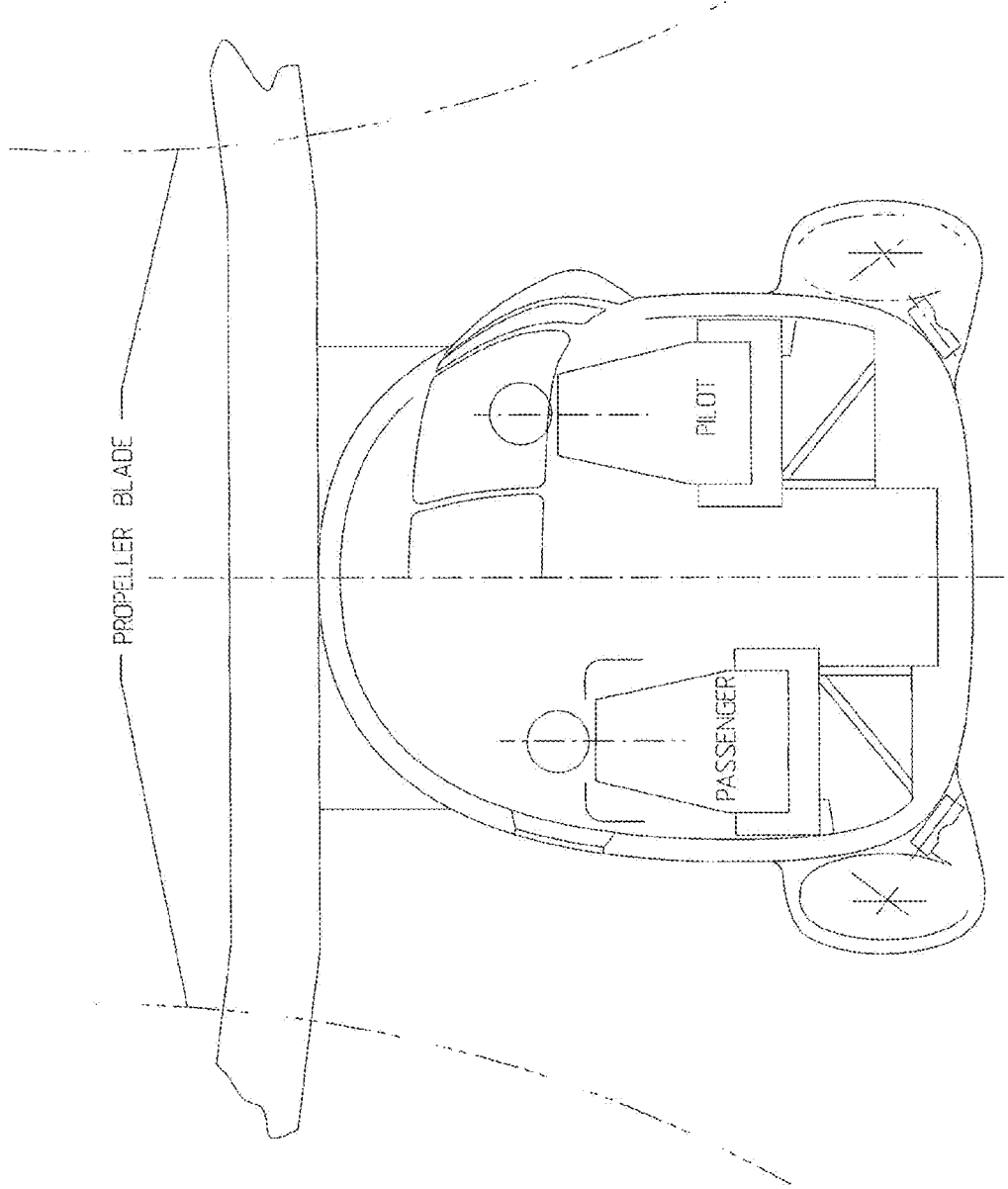
FIG. 7 presents a front view of a possible VTOL aircraft and illustrates pilot and passenger positions.
Figure 8:
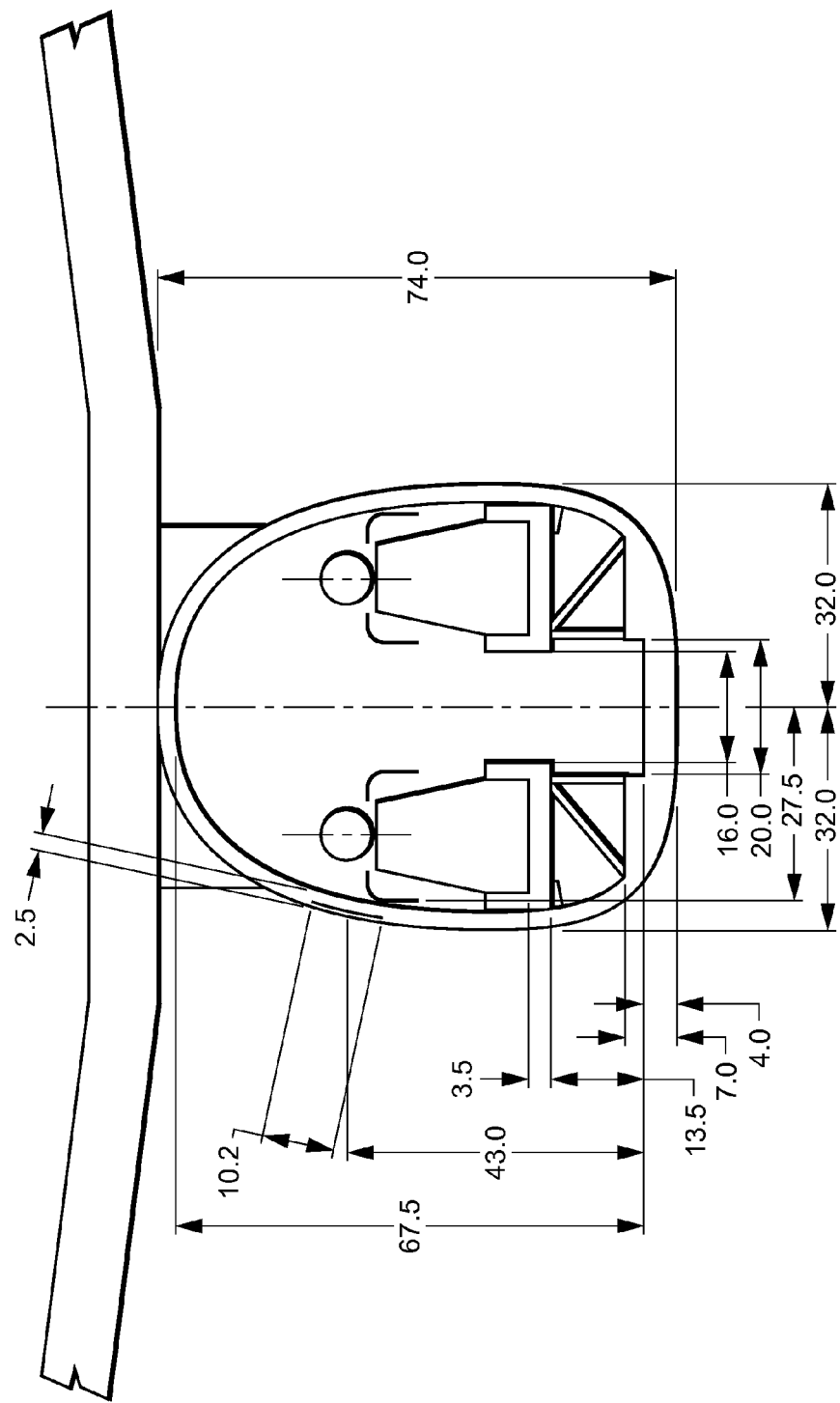
FIG. 8 presents cross sectional view of a possible VTOL aircraft.
Figure 11B:
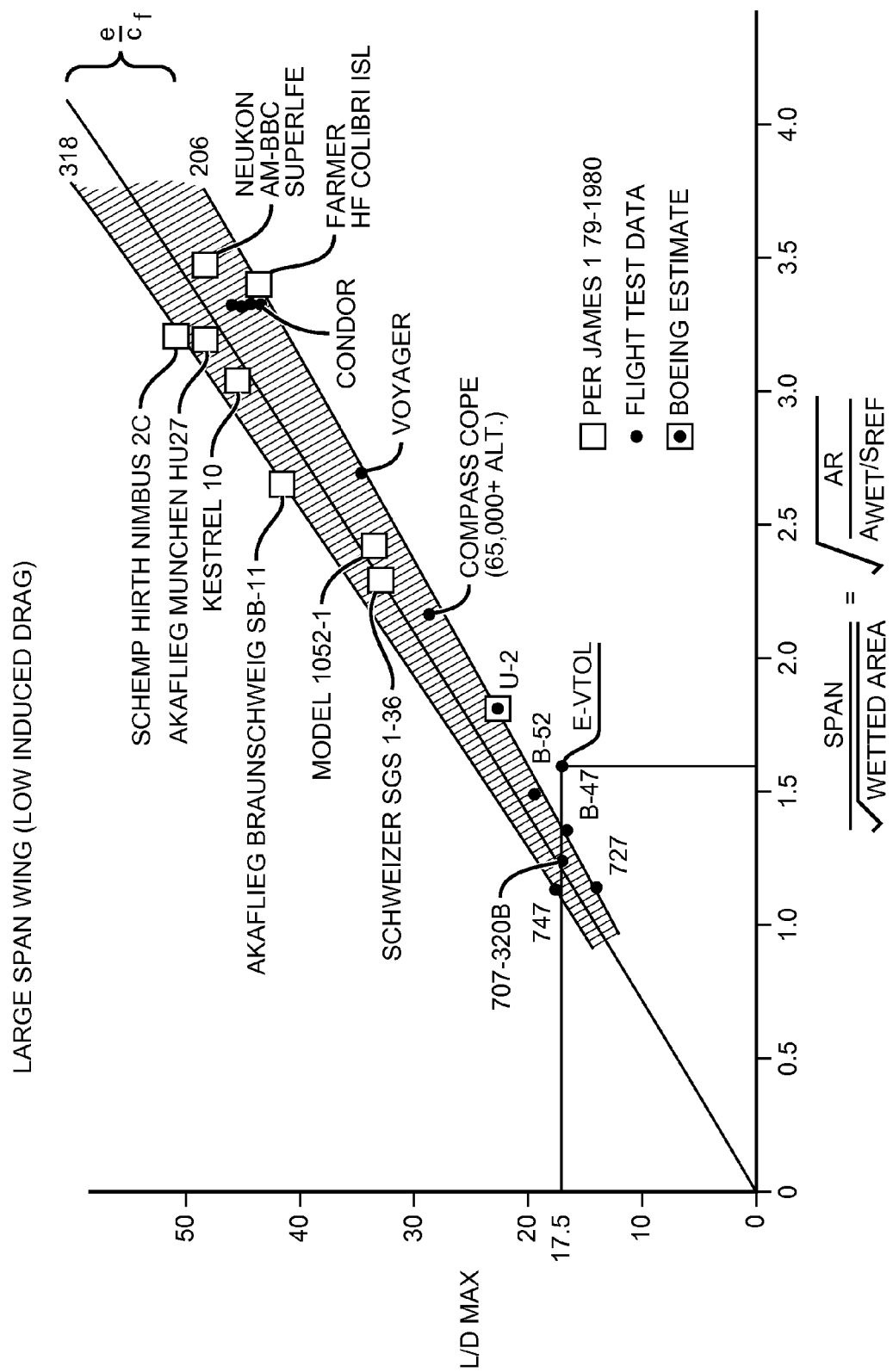
Figure 12:
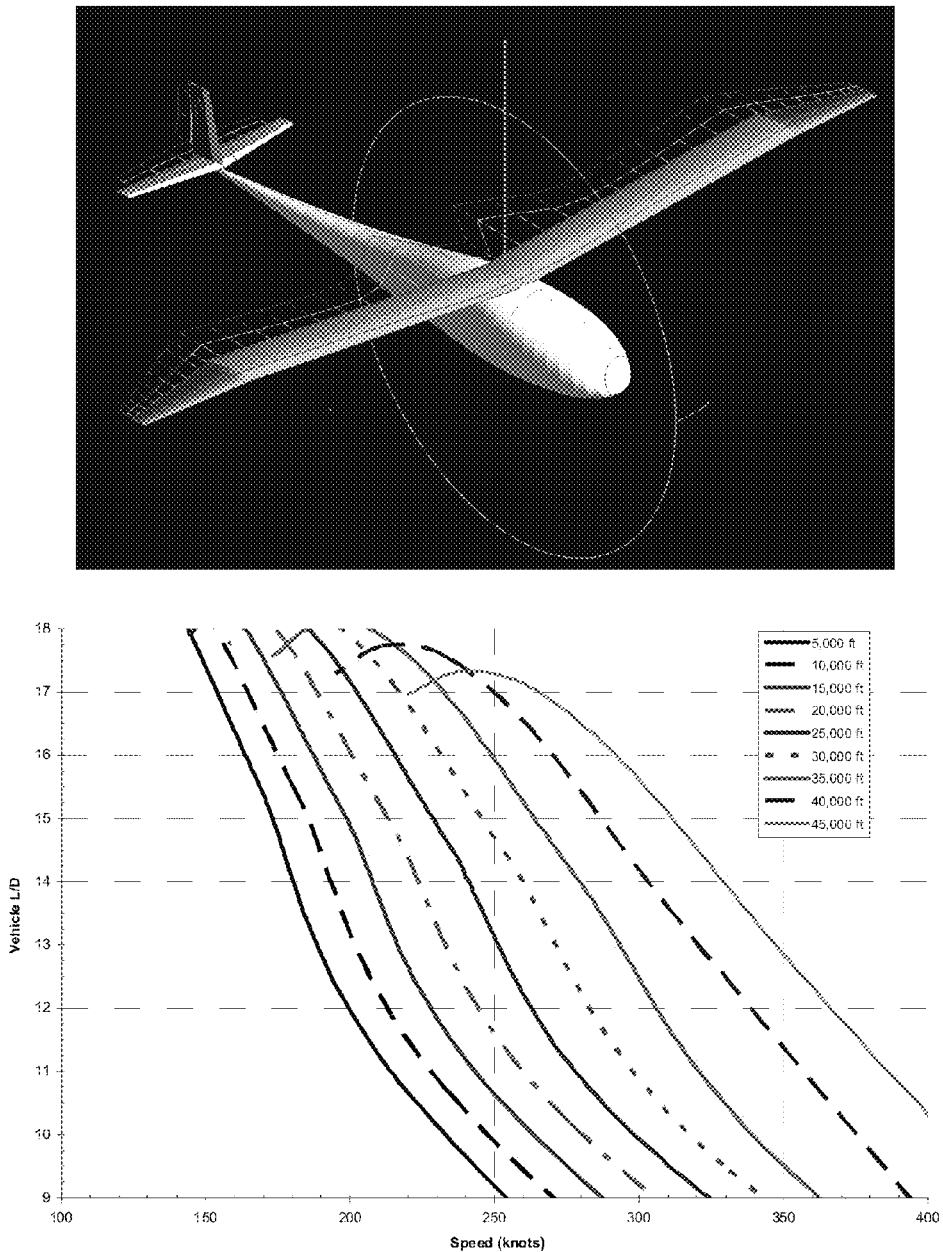
FIG. 12 presents a graph illustrating lift-to-drag performance for a typical aircraft.

FIG. 4 shows the layout of a six-place, cabin class, 7,300 lb gross weight tilt-rotor. FIGS. 5, 6, 7, and 8 add detail to assure dimensional practicality. FIGS. 9A and 9B provide a table having a weight breakdown employing the electrical power and drive system, including electric propulsion, motors, cabling, and turbine/generator, designed under contract by a major aerospace supplier. Empty weight fraction excluding energy power pack is 48%. Battery pack is assumed to provide at least 133 W-hr/kg usable energy density for 4 minutes of hover/climb/landing power. FIG. 10 estimates hover performance, out of ground effect. FIGS. 11A, 11B, and 12 provide an estimated check on lift-to-drag ratio to assure that 15:1 is easily achieved.

Based on the above parameters and with the weight breakdown from the table of FIGS. 9A and 9B, an embodiment having the illustrative 7,300 lb, 6-place, light hybrid would cruise at 18 kft and 210 kts with a range of over 1200 nm with one minute controlled vertical electric reserve for landing. Alternatively, holding the electrical propulsion aspects and gross weight of the airframe the same, but quadrupling sea level turbine size/power and nudging up generator size to 460 kW continuous output from the previous continuous 400 kW, enables over-the-weather cruise at 37,000 ft altitude and 300 kts with a 25% sacrifice in range to nearly 900 nm.

An all-battery embodiment of a purebred variant would require at least about 319 kW output from the batteries for 210 kts at 18 kft altitude. Allowing for 4 minutes of takeoff, initial climb to 4,500 ft, and reserve for landing at 600 kW of draw power for 540 shaft kWs of multi-motor output, the purebred could achieve nearly 250 nm of range with 1 minute powered vertical reserve using 400 W-hrs/kg (usable) batteries.

The same airframe configured as a heavy hybrid with 50 nm, 6,000 ft altitude, 165 kt, battery-only range using 200 W-hr/kg (usable) batteries could achieve a total range of 720 nm by climbing to 18 kft altitude and cruising at 210 kts on its sustainer energy/power source. Such an embodiment could employ the same turbine and generator as utilized in the 18 kft, 210 kt light hybrid above.

One should note that performance varies widely among the three exemplary aircraft, depending on sustainer energy/power source, making the two hybrids more appropriate for the higher performance demands of light-business up through cargo and charter applications. The purebred battery electric version could be limited to personal aircraft applications until battery technologies develop further.

The airframe weights and Optimum Speed Tilt Rotor (OSTR) performances are based on and adapted from the demonstrated performance of DARPA's all-carbon A160 Hummingbird of the same approximate 6,000 lb gross weight and 6 lb/sq ft disk loading. The ultra high performance electric motors, controller/inverter, and generators/rechargers, cabling, switching, etc. are based on demonstrated proprietary aerospace industry designs under contract to the assignee of this application. A small (950 shp) gas turbine can be based on the Army's (AATD) Small Heavy Fuel Engine (SHFE) development program as demonstrated by Honeywell™ Rechargeable battery performance is drawn from near-term developments by several suppliers (e.g., LG and A-123) currently maturing products under the automotive plug-in hybrid programs scheduled for introduction by the 2011 automotive model year. Higher performance battery estimates come from bench chemistry at various National Laboratories and the highest from Sion™, which projects >400 W-hrs/kg from LiS and has demonstrated 350 W-hrs/kg, though with only 100 cycle life. Aerodynamics estimates are based on the tilt-rotor vehicles in the thoroughly vetted Joint Heavy Lift (JHL) design competition and the Army's baseline design designated High Efficiency Tilt Rotor (HETR).

Completely autonomous flight control/management of rotary-wing aircraft has been demonstrated in the A160 Hummingbird and Northrop Grumman™ MQ-8 Fire Scout unmanned military rotorcraft. Recharge of batteries during flight for the hybrid configurations can of course be utilized, but powered terminal operations (e.g., takeoff, climb, landing, etc.) do not rely on recharge for safe operation in the event of sustainer failure.

Additional Considerations

The disclosed inventive subject matter makes strides over known art by combining various subsystems in manners that achieve unexpected results. Ordinarily, designers would avoid using a plurality of electric drive motors within a VTOL aircraft due to the complexities of de-clutching such motors from a combining gearbox after motor failure. However, the applicants have appreciated that the benefits far outweigh the inefficiencies.

The inventive subject matter is considered to include at least three architectures of electrically driven vertical take-off and landing (VTOL) aircraft which are (1) politically compatible in safety, noise, exhaust emissions, and outwash velocity with terminal operations (powered hovering, VTOL) in densely populated built-up locales, (2) market competitive in range and speed, with existing equivalent class, fixed-wing and rotary-wing aircraft, (3) basing-independent to a degree by reliance on electric energy recharge instead of entirely on onboard electrical generators using logistic fuels, and which are variously composed of previously demonstrated, independently vetted, technically equivalent, aerodynamically efficient, lightweight airframes, efficient multi-RPM rotors, lightweight reduction gears, high power density electric drive motors and generators, high energy and power density batteries, efficient lightweight engines and fuel cells, and autonomous flight management systems.

One should appreciate that presented concepts also allow for E-VTOL aircraft having the following characteristics as discussed above:

An electric motor-driven, high aspect ratio (>12) tilt-rotor aircraft, with glide ratio $\geq 14$, cruise rotor propulsive efficiency $\geq 0.85$, empty weight fraction $\leq 0.50$ (absent electrical energy/power package source)

A plurality of electric drive motors for each rotor with each motor of sufficient power that one propulsion motor inoperative (OPMI) will not prevent hover-out-of-ground-effect (HOGE) and will allow continued HOGE without the requirement for propulsion cross-shafting, For light-hybrid electric power train architecture, sufficient rechargeable electric energy storage (e.g., battery) at $\geq 100$ W-hrs/kg (usable) to enable 3 minutes of take-off and climb and 1 minute of landing, all at HOGE power draw, and power capacity to execute 30 second vertical landing with half electrical energy storage inoperative, all without recourse to non-stored electrical sustainer energy/power For heavy-hybrid electric power train architecture, sufficient rechargeable stored electric energy (e.g., battery) at $\geq 200$ W-hrs/kg (usable) to enable $\geq 50$ nm range without recourse to non-stored electrical sustainer energy/power For purebred electric power train architecture, sufficient rechargeable stored electric energy (e.g., battery) at $\geq 400$ W-hrs/kg (usable) to enable, $\geq 200$ nm range with no non-stored electrical sustainer energy incorporated in the power architecture Rotor tip velocity $\leq 0.7$M, and Disk loading $\leq 15$ lbs/sq ft.

Due to the fertile inventive ground surrounding the presented concepts, the inventive subject matter is considered to include additional concepts or variations on the presented concepts.

Table 3 includes a possible set of claims directed to a VTOL aircraft having a plurality of motors coupled to a rotor. Should one of the motors fail, one or more of the remaining operative motors can be configured to drive the rotor.

TABLE 3

Claim Set A

1  A vertical takeoff and landing (VTOL) heavier than air aircraft, comprising:
at least a plurality of electric motors coupled to a first rotor of the aircraft where the remaining operative motors are capable of driving the first rotor upon failure of one motor;
an electrical energy store coupled to the motors; and
wherein the aircraft is capable achieving hover-out-of-ground-effect (HOGE) within at least four minutes with one propulsion motor inoperative (OPMI) using the electrical motor(s) while carrying a payload of at least 50 pounds.

2  The aircraft of claim 1, wherein the plurality of motors couple to a second rotor of the aircraft where the remaining inoperative motors are capable of driving the second rotor upon failure of one motor.

3  The aircraft of claim 2, wherein the aircraft lacks a cross shaft coupling the motors to the separate rotors.

4  The aircraft of claim 2, wherein the aircraft lacks a multi-speed gearbox.

5  The aircraft of claim 2, wherein the first and the second rotors correspond to a first and a second nacelle, respectively; the first and second nacelles housing a plurality of motors, separately or in combination, each nacelle capable of four minutes of HOGE power after OPMI.

6  The aircraft of claim 2, wherein the rotors are tiltable

7  The aircraft of claim 1, wherein the aircraft is capable of achieving HOGE while generating less than 120 dB of sound.

8  The aircraft of claim 1, wherein the rotor is tiltable.

Table 4 provides a possible claim set describing a method of providing a VTOL aircraft having a reduced "dead man's zone". The VTOL aircraft is configured to comply with one or more safety metrics that would be considered improvements over existing aircraft designs, including fixed wing aircraft. An individual, possibly a buyer of an aircraft, can be presented a comparison of the VTOL aircraft with that of other aircraft to allow the individual to make informed decisions.

TABLE 4

Claim Set B

1  A method of providing a vertical takeoff and landing (VTOL) heavier than air aircraft having a reduced "dead man's zone", comprising:
providing a design for a VTOL aircraft comprising at least one rotor;
coupling a plurality of redundant electrical motors to the at least one rotor;
coupling an electrical energy store to the plurality of electrical motors in a manner sufficient for the aircraft to hover out of ground effect for at least four minutes with OPMI;

TABLE 4-continued

Claim Set B configuring the VTOL aircraft to comply with a plurality of safety metric, including a dead man's zone; and
presenting an individual with a comparison of at least one safety metric, including the dead man's zone, of the VTOL aircraft to a second safety metric of a second, different aircraft having a design that is different from the VTOL aircraft.
2  The method of claim 2, the method of claim 1 wherein the at least one safety metric comprises an estimated metric.
3  The method of claim 2, wherein the at least one safety metric comprises accidents per flight-hour.
4  The method of claim 2, wherein the at least one safety metric comprises fatalities per flight-hour.
5  The method of claim 2, wherein the second aircraft comprises a fixed-wing aircraft.
6  The method of claim 1, further comprising coupling the plurality of electric motors to at least two rotors and to the electrical energy store.
7  The method of claim 1, further comprising adapting the aircraft to recharge the electrical energy store while in flight under power of a fuel driven engine.

Table 5 provides another possible claim set where an electrically powered VTOL aircraft has various possible ranges and cruising speeds.

TABLE 5

Claim Set C

1  A vertical takeoff and landing (VTOL) heavier than air aircraft, comprising:
    a plurality of electric motors, each coupled to a plurality of rotors;
    an electrical energy store coupled to each of the motors; and
    wherein the aircraft can carry a payload of at least 200 pounds for a range of at least about X nautical miles (nm) at a cruising speed of up to about Y knots, where X is 200 and Y is 165 knots.
2  The aircraft of claim 1, wherein X is 800 nm and Y is 340 knots.
3  The aircraft of claim 1, wherein X is 800 nm and Y is 300 knots.
4  The aircraft of claim 1, wherein X is 800 nm and Y is 210 knots.

Table 6 provides an additional claim set where a contemplated VTOL aircraft comprises a sustainer energy source capable of driving an electric motor of a rotor.

TABLE 6

Claim Set D

1  A vertical takeoff and landing (VTOL) heavier than air aircraft, comprising:
    an electric motor coupled to a rotor;
    an electrical energy store coupled to the motor;
    a sustainer energy source comprising at least one of a rotating generator, electric fuel cell, or electric semi-cell, and that is electrically coupled to the electric motor; and
    wherein the electric motor is mechanically decoupled from the sustainer power supply.
2  The aircraft of claim 1, wherein the sustainer energy source is fuel driven.
3  The aircraft of claim 1, wherein the electric motor is within a nacelle of the rotor, and wherein the sustainer energy source is external to the nacelle.
4  The aircraft of claim 1, wherein the rotor is tiltable.

Table 7 presents a possible claim set relating to a VTOL aircraft where a sustainer energy source retains a preferred orientation relative to a fuselage of the aircraft as the rotors of the aircraft tilt.

TABLE 7

Claim Set E

1  A vertical takeoff and landing (VTOL) heavier than air aircraft, comprising:
    an electric motor coupled to a tiltable rotor;
    an electrical energy store coupled to the motor; and
    a sustainer power supply providing electrical power to the electric motor where the sustainer power supply retains a preferred orientation relative to a fuselage of the aircraft as the rotor tilts.
2  The aircraft of claim 1, wherein the rotor is engaged with a tiltable nacelle.
3  The aircraft of claim 2, wherein the electric motor is housed within the nacelle.
4  The aircraft of claim 2, wherein the sustainer power supply is external to the nacelle.
5  The aircraft of claim 1, wherein the sustainer power supply is configured to retain the preferred orientation relative to the fuselage of the aircraft during flight.

Thus, specific compositions and methods of the inventive subject matter have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A vertical takeoff and landing (VTOL), electrically-powered, winged aircraft, comprising:
    first and second tiltable nacelles disposed on a left wing and a right wing of the aircraft, respectively, each of the first and second nacelles configured to tilt with respect to the left and right wing, respectively;
    first and second sets of electric motors disposed in the respective first and second nacelles;
    first and second rotors mounted on the first and second nacelles, respectively, the first and second electric rotors configured to collectively produce a thrust force counter to a weight of the aircraft;

at least one electrical energy store coupled simultaneously and separably to each motor of the first and second sets;

wherein the at least one electrical energy store is configured to provide sufficient energy such that the aircraft is capable of achieving hover-out-of-ground-effect (HOGE) for a period of at least four minutes while one of the motors of the left or right set is inoperative, and while the aircraft carries a payload of at least 300 pounds;

wherein the first rotor has a maximum tip speed of less than Mach 0.7 M at sea level in a standard atmosphere; and wherein the aircraft lacks a cross shaft coupling the electric motor set or rotor of the first or second nacelle to the electric motor set or rotor of the other nacelle, wherein the aircraft lacks a shifting gearbox between each of the first and second electric motor sets and its respective rotor, and wherein the aircraft has a maximum disk loading of less than 15 lbs/sq ft.

2. The aircraft of claim 1, wherein the at least electrical energy store comprises a rechargeable battery having at least 2 KW/Kg power density and at least 100 W-hrs/kg usable energy density.

3. The aircraft of claim 2, wherein the rechargeable battery is repositionable within the aircraft for center of gravity adjustment.

4. The aircraft of claim 1, wherein the at least one electrical energy store is field replaceable.

5. The aircraft of claim 1, further comprising at least one sustainer energy source configured to generate sufficient electricity to (a) power the first and second sets of electric motors to drive the first and second rotors, respectively, such that the aircraft can climb above 4500 ft in altitude and have a cruise speed of at least 165 kts, and (b) at least partially recharge the at least one electrical energy store.

6. The aircraft of claim 5, wherein the at least one sustainer energy source is selected from the group consisting of (1) a second rechargeable battery having a usable energy density of at least 400 W-hrs/kg, (2) a second rechargeable battery and a fuel driven electric generator that sequentially supply power, where the second rechargeable battery has a usable energy density of at least 200 W-hrs/kg, and (3) a fuel driven engine with a generator.

7. The aircraft of claim 5, wherein the at least one sustainer energy source comprises a second rechargeable battery having a usable energy density of at least 400 W-hrs/kg, such that the aircraft is configured to fly at least 200 nautical miles at the cruise speed of 165 kts and at a altitude of at least 6,000 feet using only the second rechargeable battery.

8. The aircraft of claim 5, wherein the at least one sustainer energy source comprises a second rechargeable battery and a fuel driven electric generator that sequentially supply power, where the rechargeable battery has a usable energy density of at least 200 W-hrs/kg, such that the aircraft is configured to fly (a) at least 50 nautical miles at the cruise speed of 165 kts and at a altitude of at least 6,000 feet using only the second rechargeable battery, and (b) at least 650 nautical miles at the cruise speed of 210 knots and at an altitude of 18,000 feet using the fuel driven electric generator.

9. The aircraft of claim 5, wherein the at least one sustainer energy source comprises a fuel driven engine with a generator, such that the aircraft is configured to fly at least 1,200 nautical miles at the cruise speed of 300 kts and at a altitude of 37,000 feet using only the fuel driven engine with the generator.

10. The aircraft of claim 5, wherein the at least one electrical energy store is configured to be recharged from the at least one sustainer energy source.

11. The aircraft of claim 1, wherein the payload is 3,500 pounds.

12. The aircraft of claim 1, wherein the at least one sustainer energy source is further configured to retain a preferred orientation relative to gravity as the first and second nacelles tilt.

13. The aircraft of claim 1, wherein the aircraft is capable of achieving HOGE while generating less than 40 dB of sound as measured by an observer on the ground 1,500 feet away from the aircraft.

* * * * *